United States Patent
Washizu et al.

(10) Patent No.: US 9,598,546 B2
(45) Date of Patent: Mar. 21, 2017

(54) OPTICAL FILM

(71) Applicant: TEIJIN CHEMICALS, LTD., Tokyo (JP)

(72) Inventors: Akiko Washizu, Tokyo (JP); Masatoshi Ando, Tokyo (JP); Tetsuya Motoyoshi, Tokyo (JP); Shoichi Maekawa, Tokyo (JP)

(73) Assignee: TEIJIN CHEMICALS, LTD., Tokyo (JP)

( * ) Notice: Subject to any disclaimer, the term of this patent is extended or adjusted under 35 U.S.C. 154(b) by 138 days.

(21) Appl. No.: 14/669,494

(22) Filed: Mar. 26, 2015

(65) Prior Publication Data

US 2015/0197608 A1    Jul. 16, 2015

Related U.S. Application Data

(62) Division of application No. 13/139,068, filed as application No. PCT/JP2009/070715 on Dec. 4, 2009, now abandoned.

(30) Foreign Application Priority Data

Dec. 16, 2008 (JP) .................. 2008-319600

(51) Int. Cl.
| | | |
|---|---|---|
| B29D 7/01 | (2006.01) |
| C08J 5/18 | (2006.01) |
| C08G 64/02 | (2006.01) |
| C08G 64/16 | (2006.01) |
| G02B 5/30 | (2006.01) |
| G02F 1/13363 | (2006.01) |

(52) U.S. Cl.
CPC ............ *C08J 5/18* (2013.01); *C08G 64/0208* (2013.01); *C08G 64/1608* (2013.01); *G02B 5/3083* (2013.01); *G02F 1/133634* (2013.01); *C08J 2369/00* (2013.01); *G02F 2001/133637* (2013.01); *Y10T 428/1036* (2015.01)

(58) Field of Classification Search
CPC .... C08J 5/18; C08G 64/0208; C08G 64/1608; G02F 1/133634; G02F 1/13363; G02F 2001/133637; G02B 5/3083; Y10T 428/1036; Y10T 428/1041; Y10T 428/31507
USPC ..... 428/1.1, 1.31, 1.34, 412, 64.7; 264/1.29, 264/1.6, 1.34; 349/75, 96, 98, 117; 528/196, 204, 206
See application file for complete search history.

(56) References Cited

U.S. PATENT DOCUMENTS

| | | |
|---|---|---|
| 5,858,499 A | 1/1999 | Abe et al. |
| 6,565,974 B1 | 5/2003 | Uchiyama et al. |
| 2010/0104777 A1 | 4/2010 | Motoyoshi et al. |

FOREIGN PATENT DOCUMENTS

| | | |
|---|---|---|
| JP | 02-120804 | 5/1990 |
| JP | 09-268225 | 10/1997 |
| JP | 10-101786 | 4/1998 |
| JP | 2000-137116 | 5/2000 |
| JP | 3325560 | 7/2002 |
| JP | 2002-258045 | 9/2002 |
| JP | 2006-154436 | 6/2006 |
| JP | 2006-234878 | 9/2006 |
| JP | 2007-093654 | 4/2007 |
| JP | 2007-232874 | 9/2007 |
| JP | 2007-279091 | 10/2007 |
| WO | 2006/041190 | 4/2006 |
| WO | 2008/156186 | 12/2008 |

OTHER PUBLICATIONS

Search Report issued Jan. 20, 2014 in corresponding Taiwanese Application No. 98142269, with partial English language translation.
International Preliminary Report on Patentability issued Jul. 5, 2011 in International Application No. PCT/JP2009/070715.
International Search Report issued Mar. 16, 2010 in International Application No. PCT/JP2009/070715.

*Primary Examiner* — Ruiyun Zhang
(74) *Attorney, Agent, or Firm* — Wenderoth, Lind & Ponack, L.L.P.

(57) ABSTRACT

An optical film having a desired wavelength dispersion characteristic, a low photoelastic coefficient and a desired Nz coefficient.
The optical film is formed from a copolymer and meets the following conditions (i) to (v):
(i) the thickness (d) is 20 to 80 μm;
(ii) the following formulas (1) and (2) are satisfied:

$$0.6 < R(450)/R(550) < 1 \quad (1)$$

$$1.01 < R(650)/R(550) < 1.40 \quad (2)$$

(R(450), R(550) and R(650) are retardations within the plane of the film at respective wavelengths);
(iii) R(550) is 120 to 160 nm;
(iv) the birefringence (Δn) is not less than $1.5 \times 10^{-3}$; and
(v) the Nz coefficient represented by the following formula (4) is 1.18 to 2.40:

$$Nz = (n_x - n_z)/(n_x - n_y) \quad (4)$$

($n_x$, $n_y$ and $n_z$ are 3-dimensional birefringences of the film).

5 Claims, No Drawings

OPTICAL FILM

TECHNICAL FIELD

The present invention relates to an optical film which has a desired wavelength dispersion characteristic and is used in a liquid crystal display or the like.

BACKGROUND ART

In general, an optical film, especially a retardation film is used in displays such as liquid crystal displays and has such functions as color correction, view angle expansion and antireflection.

A λ/4 plate and a λ/2 plate are known as the retardation film, and thermoplastic polymers such as polycarbonate obtained by polycondensing bisphenol A, polyether sulfone and polysulfone are used as the materials of these plates. The λ/4 plate and the λ/2 plate obtained by stretching films of these materials are characterized in that their retardation becomes larger as the wavelength becomes shorter. Therefore, the wavelength at which the λ/4 plate and the λ/2 plate can function is limited to a specific wavelength.

As means of controlling the wavelength at a broad band, there is known a method in which two or more birefringence films having different wavelength dependences of retardation are laminated together at a specific angle (refer to Patent Document 1). In this case, as a plurality of retardation films are used, the step of laminating together these retardation films and the step of adjusting the lamination angle are required, thereby causing a problem with productivity. Further, as the thickness of the whole retardation film becomes large, its light transmittance lowers, whereby when it is set in an apparatus, the apparatus becomes thick and dark.

There has recently been proposed a method for expanding the bandwidth with a single film without lamination (refer to Patent Document 2). This film is obtained by stretching a polymer film comprising a unit having positive refractive index anisotropy and a unit having negative refractive index anisotropy. However, as the film is a polymer film comprising a unit having positive refractive index anisotropy and a unit having negative refractive index anisotropy, it is difficult to make it thin due to its low birefringence. It also has a problem that its contrast is not good due to its low Nz coefficient. Further, as an aromatic copolycarbonate having a fluorene-based bisphenol skeleton is used, it has a high melting temperature, thereby readily producing a gelled product through its decomposition when it is melt processed. Further, as it has a high Tg (glass transition temperature), a high temperature is required for stretching the film, and special processing equipment different from that of the prior art is needed. Therefore, it cannot be said that its processability is satisfactory. Further, as the film has a high photoelastic constant, its stress birefringence becomes large and light slipping occurs when the film is used as a retardation film. It is known that this phenomenon is proportionate to the absolute value of "photoelastic constant× thickness", and it is therefore desired that the photoelastic constant should be low and the thickness should be small.

To produce a retardation film having a reverse wavelength dispersion to reduce its photoelastic constant, there is reported a method in which a polyvinyl acetal resin containing a specific structure is melt extruded into a sheet form and then stretched (refer to Patent Document 3). However, this method has problems that it is difficult to make the film thin due to its low birefringence and its Nz coefficient is low.

(Patent Document 1) JP-A 02-120804
(Patent Document 2) Japanese Patent No. 3325560
(Patent Document 3) JP-A 2006-234878

DISCLOSURE OF THE INVENTION

It is the principal object of the present invention to provide an optical film which has a desired wavelength dispersion characteristic, a low photoelastic constant, excellent melt processability and a desired Nz coefficient and can be made thin due to its high birefringence.

It is another object of the present invention to provide a retardation film which is melt molded from polymers of the same type and can expand the bandwidth by itself.

The inventors of the present invention have conducted intensive studies and have found that an optical film comprising a copolycarbonate of a diol having a fluorene structure in the side chain and an alicyclic aliphatic diol exhibits a reverse wavelength dispersion that the retardation becomes smaller as the wavelength becomes shorter, has a low photoelastic constant, excellent melt processability and a desired Nz coefficient and can be made thin due to its high birefringence. The present invention has been accomplished based on this finding.

That is, the present invention includes the following inventions.

1. An optical film which is formed from a copolymer and meets the following conditions (i) to (v):
(i) the thickness (d) is 20 to 80 μm;
(ii) the following formulas (1) and (2) are satisfied:

$$0.6 < R(450)/R(550) < 1 \quad (1)$$

$$1.01 < R(650)/R(550) < 1.40 \quad (2)$$

(R(450), R(550) and R(650) are retardations within the plane of the film at wavelengths of 450 nm, 550 nm and 650 nm, respectively);
(iii) R(550) is 120 to 160 nm (R(550) is a retardation within the plane of the film at a wavelength of 550 nm);
(iv) the birefringence (Δn) represented by the following formula (3) is not less than $1.5 \times 10^{-3}$:

$$\Delta n = R(550)/(d \times 10^3) \quad (3)$$

(d is the thickness (μm) of the film); and
(v) the Nz coefficient represented by the following formula (4) is 1.18 to 2.40:

$$Nz = (n_x - n_z)/(n_x - n_y) \quad (4)$$

($n_x$, $n_y$ and $n_z$ are 3-dimensional birefringences of the film, $n_x$ is the refractive index of an in-plane slow axis (x axis), $n_y$ is a refractive index in a direction (y axis) orthogonal to the x axis in the in-plane direction, and $n_z$ is a refractive index in a thickness direction (z axis) perpendicular to the plane including the x axis and the y axis).
2. The optical film in the above paragraph 1 which is obtained by stretching a film comprising a copolycarbonate containing a unit (A) represented by the following formula:

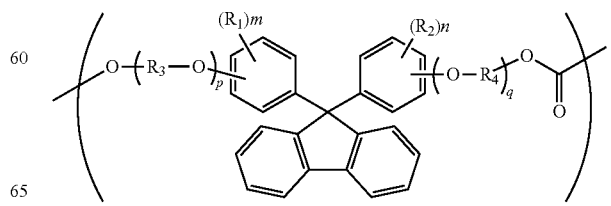

(wherein $R_1$ and $R_2$ are each independently a hydrogen atom, hydrocarbon group having 1 to 10 carbon atoms which may contain an aromatic group, or halogen atom, $R_3$ and $R_4$ are each independently a hydrocarbon group having 1 to 10 carbon atoms which may contain an aromatic group, m and n are each independently an integer of 1 to 4, and p and q are each independently an integer of 0 or more)
and a unit (B) having a positive refractive index,
the molar ratio $\{(A):(B)\}$ of the unit (A) to the unit (B) being 10:90 to 70:30.

3. The optical film in the above paragraph 2, wherein the copolycarbonate contains the unit (A) represented by the following formula:

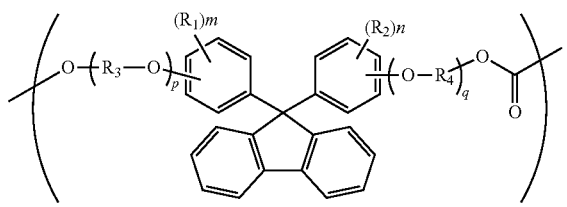

(A)

(wherein $R_1$ and $R_2$ are each independently a hydrogen atom, hydrocarbon group having 1 to 10 carbon atoms which may contain an aromatic group, or halogen atom, $R_3$ and $R_4$ are each independently a hydrocarbon group having 1 to 10 carbon atoms which may contain an aromatic group, m and n are each independently an integer of 1 to 4, and p and q are each independently an integer of 0 or more)
and a unit (B1) represented by the following formula:

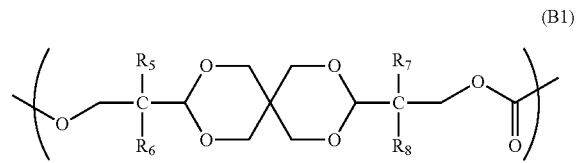

(B1)

(wherein $R_5$ to $R_8$ are each independently a hydrogen atom or alkyl group having 1 to 10 carbon atoms),
the molar ratio $\{(A):(B1)\}$ of the unit (A) to the unit (B1) being 10:90 to 70:30.

4. The optical film in the above paragraph 3, wherein the copolycarbonate contains a unit (A1) represented by the following formula:

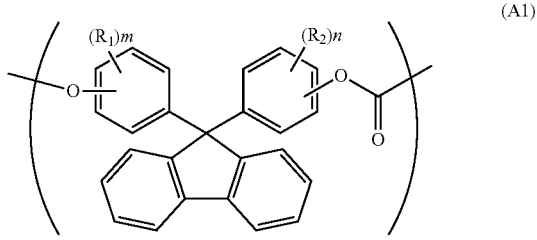

(A1)

(wherein $R_1$ and $R_2$ are each independently a hydrogen atom, hydrocarbon group having 1 to 10 carbon atoms which may contain an aromatic group, or halogen atom, and m and n are each independently an integer of 1 to 4), and the unit (B1) represented by the following formula:

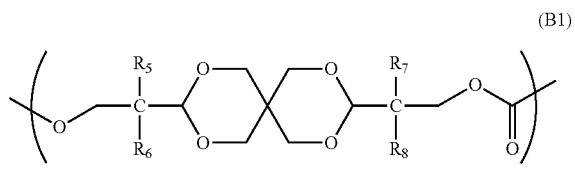

(B1)

(wherein $R_5$ to $R_8$ are each independently a hydrogen atom or alkyl group having 1 to 10 carbon atoms),
the molar ratio $\{(A1):(B1)\}$ of the unit (A1) to the unit (B1) being 10:90 to 50:50.

5. The optical film in the above paragraph 4, wherein the molar ratio $\{(A1):(B1)\}$ of the unit (A1) to the unit (B1) of the copolycarbonate is 20:80 to 40:60.

6. The optical film in the above paragraph 4, wherein the copolycarbonate contains a unit (A2) represented by the following formula:

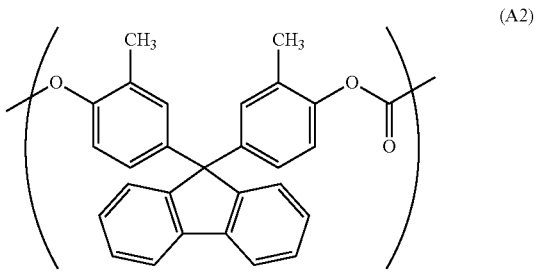

(A2)

and a unit (B2) represented by the following formula:

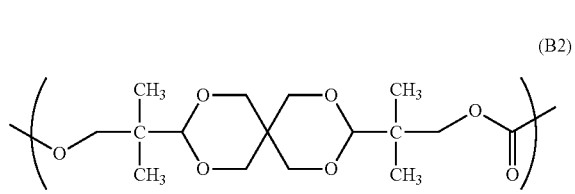

(B2)

7. The optical film in the above paragraph 3, wherein the copolycarbonate contains a unit (A3) represented by the following formula:

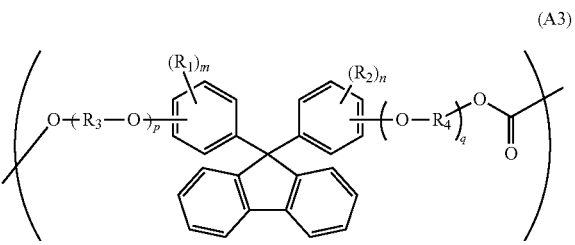

(A3)

(wherein $R_1$ and $R_2$ are each independently a hydrogen atom, hydrocarbon group having 1 to 10 carbon atoms which may contain an aromatic group, or halogen atom, $R_3$ and $R_4$ are each independently a hydrocarbon group having 1 to 10 carbon atoms which may contain an aromatic group, m and n are each independently an integer of 1 to 4, and p and q are each independently an integer of 1 or more)

and the unit (B1) represented by the following formula:

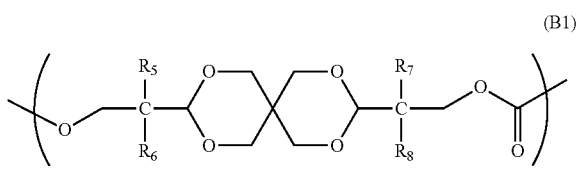

(wherein $R_5$ to $R_8$ are each independently a hydrogen atom or alkyl group having 1 to 10 carbon atoms),
the molar ratio {(A3):(B1)} of the unit (A3) to the unit (B1) being 20 to 80 to 70:30.
8. The optical film in the above paragraph 7, wherein the molar ratio {(A3):(B1)} of the unit (A3) to the unit (B1) of the copolycarbonate is 30:70 to 60:40.
9. The optical film in the above paragraph 7, wherein the copolycarbonate contains a unit (A4) represented by the following formula:

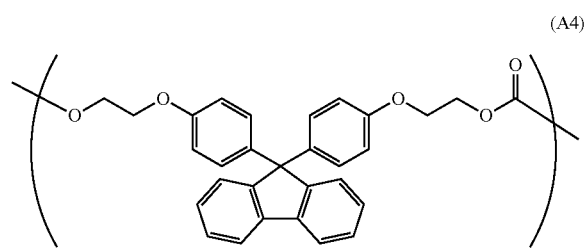

and the unit (B2) represented by the following formula:

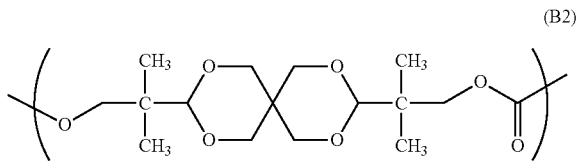

10. The optical film in the above paragraph 1, wherein the absolute value of the photoelastic constant of the copolymer is not more than $30 \times 10^{-12}$ $Pa^{-1}$
11. The optical film in the above paragraph 1, wherein the absolute value of "photoelastic constant× thickness" is not more than $1,700 \times 10^{-12}$ $Pa^{-1} \cdot \mu m$.
12. The optical film in the above paragraph 1, wherein the glass transition temperature of the copolymer is 120 to 170° C.
13. A retardation film which is the optical film of the above paragraphs 1 to 12.
14. A liquid crystal display comprising the retardation film of the above paragraph 13.

BEST MODE FOR CARRYING OUT THE INVENTION

The present invention will be described in detail hereinunder.

The optical film of the present invention is formed from a copolymer, particularly preferably a copolycarbonate, and meets the above conditions (i) to (v).

The optical film of the present invention is obtained by stretching a film containing the copolycarbonate.

The copolycarbonate preferably contains a unit (A) and a unit (B). The optical film of the present invention may contain a homopolycarbonate consisting of only the unit (A) or a homopolycarbonate consisting of only the unit (B) besides the copolycarbonate.

<Unit (A)>

The unit (A) is represented by the following formula.

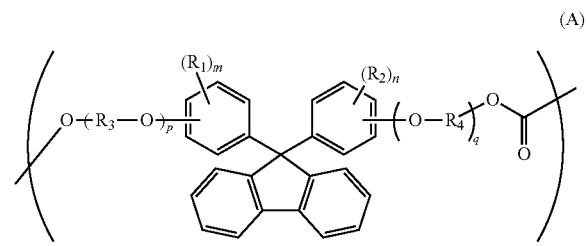

In the above formula, $R_1$ and $R_2$ are each independently a hydrogen atom, hydrocarbon group having 1 to 10 carbon atoms which may contain an aromatic group, or halogen atom.

Examples of the hydrocarbon group include an alkyl group having 1 to 10 carbon atoms, cycloalkyl group having 5 to 10 carbon atoms, aryl group having 6 to 10 carbon atoms, aralkyl group having 7 to 10 carbon atoms, and alkenyl group having 1 to 10 carbon atoms. Examples of the alkyl group having 1 to 10 carbon atoms include methyl group, ethyl group, propyl group, isopropyl group, n-butyl group, sec-butyl group and tert-butyl group. Examples of the cycloalkyl group having 5 to 10 carbon atoms include cyclohexyl group and cyclooctyl group. Examples of the aryl group having 6 to 10 carbon atoms include phenyl group and naphthyl group. Examples of the halogen atom include fluorine atom, chlorine atom and bromine atom.

Examples of the aromatic group which may be contained in the hydrocarbon group include aryl groups having 6 to 10 carbon atoms such as phenyl group and naphthyl group.

$R_3$ and $R_4$ are each independently a hydrocarbon group having 1 to 10 carbon atoms which may contain an aromatic group. The hydrocarbon group is preferably an alkylene group having 1 to 10 carbon atoms, more preferably an alkylene group having 1 to 4 carbon atoms, much more preferably an ethylene group. Examples of the aromatic group which may be contained in the hydrocarbon group include aryl groups having 6 to 10 carbon atoms such as phenyl group and naphthyl group.

"p" and "q" indicate the numbers of recurring units —($R_3$—O)— and —(O—$R_4$)—, respectively. "p" and "q" are each independently an integer of 0 or more, preferably 0 to 20, more preferably 0 to 12, much more preferably 0 to 8, particularly preferably 0 to 4, most preferably 0 or 1. "m" and "n" are each independently an integer of 1 to 4.

<Unit (A1)>

When "p" and "q" are 0, the unit (A) is represented by the following formula (may be referred to as "unit (A1)" hereinafter).

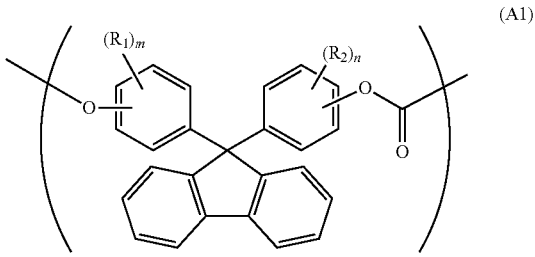

(A1)

$R_1$, $R_2$, m and n are the same as in the unit (A).

Examples of the unit (A1) include units derived from 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene and 9,9-bis(4-hydroxy-3-phenylphenyl) fluorene. Compounds inducing these units (A1) may be used alone or in combination of two or more.

<Unit (A2)>

A unit (A2) represented by the following formula and derived from 9,9-bis(4-hydroxy-3-methylphenyl)fluorene is particularly preferred.

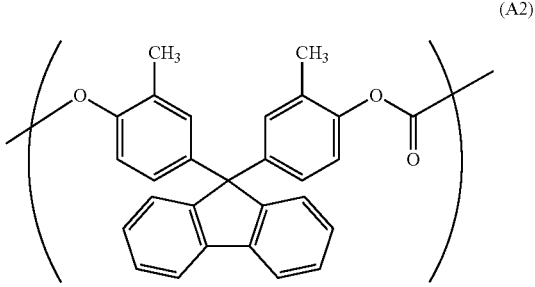

(A2)

The b value measured at an optical path length of 30 mm of a solution prepared by dissolving 10 g of a copolycarbonate containing the unit (A2) in 50 ml of ethanol is preferably not more than 6.0, more preferably not more than 5.5, much more preferably not more than 5.0. When this b value falls within the above range, an optical film formed from the copolycarbonate has a good color and high strength.

9,9-bis(4-hydroxy-3-methylphenyl)fluorene which is the raw material of the unit (A2) is obtained through a reaction between o-cresol and fluorenone. 9,9-bis(4-hydroxy-3-methylphenyl)fluorene having a small b value can be obtained by removing impurities.

Stated more specifically, after the reaction between o-cresol and fluorenone, unreacted o-cresol is distilled off, the residue is dissolved in an alcohol-based, ketone-based or benzene derivative-based solvent, and activated earth or activated carbon is added to the obtained solution, the resulting solution is filtered, and a product crystallized from the filtrate is filtered to obtain purified 9,9-bis(4-hydroxy-3-methylphenyl)fluorene. The impurities to be removed include 2,4'-dihydroxy form, 2,2'-dihydroxy form and impurities having an unknown structure.

The alcohol-based solvent used for purification is preferably a lower alcohol such as methanol, ethanol, propanol or butanol. The ketone-based solvent is preferably a lower aliphatic ketone such as acetone, methyl ethyl ketone, methyl isopropyl ketone or cyclohexanone, or a mixture thereof. The benzene derivative-based solvent is preferably toluene, xylene, benzene or a mixture thereof. The solvent is used in an amount that dissolves the fluorene compound completely, and the amount thereof is generally 2 to 10 times the amount of the fluorene compound. Commercially available activated earth comprising powdery or granular silica-alumina as the main component is used. Further, commercially available powdery or granular activated carbon is used.

<Unit (A3)>

When "p" and "q" are each an integer of 1 or more, the unit (A) is represented by the following formula (may be referred to as "unit (A3)" hereinafter).

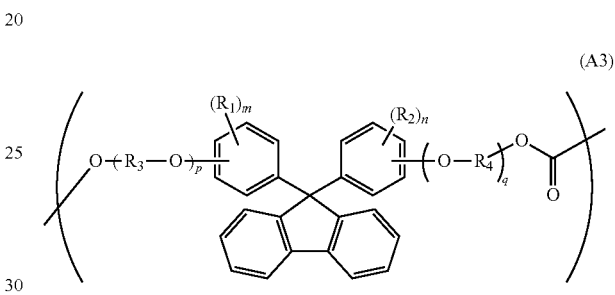

(A3)

$R_1$, $R_2$, $R_3$, $R_4$, m and n are the same as in the unit (A). "p" and "q" are each independently an integer of preferably 1 to 20, more preferably 1 to 12, much more preferably 1 to 8, particularly preferably 1 to 4, most preferably 1.

Examples of the unit (A3) include 9,9-bis[4-(2-hydroxyethoxyl)phenyl]fluorene, 9,9-bis[4-(3-hydroxypropoxyl)phenyl]fluorene, 9,9-bis[4-(4-hydroxybutoxyl)phenyl]fluorene, 9,9-bis[4-(2-hydroxyethoxy)-3-methylphenyl]fluorene, 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(2-hydroxyethoxy)-3-isopropylphenyl]fluorene, 9,9-bis[4-(2-hydroxyethoxy)-3-n-butylphenyl]fluorene, 9,9-bis[4-(2-hydroxyethoxy)-3-isobutylphenyl]fluorene, 9,9-bis[4-(2-hydroxyethoxy)-3-(1-methylpropyl)phenyl]fluorene, 9,9-bis[4-(3-hydroxypropoxy)-3-methylphenyl]fluorene, 9,9-bis[4-(4-hydroxybutoxy)-3-methylphenyl]fluorene, 9,9-bis[4-(2-hydroxyethoxy)-3,5-dimethylphenyl]fluorene, 9,9-bis[4-(2-hydroxyethoxy)-2,5-dimethylphenyl]fluorene, 9,9-bis[4-(2-hydroxyethoxy)-3,5-diethylphenyl]fluorene, 9,9-bis[4-(2-hydroxyethoxy)-3,5-dipropylphenyl]fluorene, 9,9-bis[4-(2-hydroxyethoxy)-3,5-diisopropylphenyl]fluorene, 9,9-bis[4-(2-hydroxyethoxy)-3,5-d-n-butylphenyl]fluorene, 9,9-bis[4-(2-hydroxyethoxy)-3,5-diisobutylphenyl]fluorene, 9,9-bis[4-(2-hydroxyethoxy)-3,5-bis(1-methylpropyl)phenyl]fluorene, 9,9-bis[4-(3-hydroxypropoxy)-3,5-dimethylphenyl]fluorene, 9,9-bis[4-(4-hydroxybutoxy)-3,5-dimethylphenyl]fluorene, 9,9-bis[4-(2-hydroxyethoxy)-3-cyclohexylphenyl]fluorene, 9,9-bis[4-(2-hydroxyethoxy)-3-phenylphenyl]fluorene, 9,9-bis[4-(2-hydroxyethoxy)-3,5-diphenylphenyl]fluorene, 9,9-bis[4-(2-hydroxyethoxy)-3-benzylphenyl]fluorene, 9,9-bis[4-(2-hydroxyethoxy)-3,5-dibenzylphenyl]fluorene, 9,9-bis[4-(2-hydroxyethoxy)-3-propenylphenyl]fluorene, 9,9-bis[4-(2-hydroxyethoxy)-3-fluorophenyl]fluorene, and units derived from these 9,9-bis(hydroxyalkoxyphenyl)fluorenes. Units derived from 9,9-bis[hydroxypoly(alkyleneoxy)phenyl]fluorenes in which "p" and "q" are 2 or more are also included.

Out of these, 9,9-bis[4-(2-hydroxyethoxyl)phenyl]fluorene and 9,9-bis[4-(2-hydroxyethoxy)-3-methylphenyl]fluorene are preferred.

<Unit (A4)>

A unit (A4) derived from 9,9-bis[4-(2-hydroxyethoxyl)phenyl]fluorene (BPEF) represented by the following formula is particularly preferred.

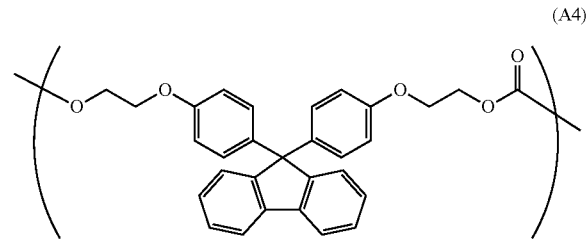

(A4)

Compounds inducing these units (A3) and (A4) may be used alone or in combination of two or more.

The compounds inducing the units (A3) and (A4) are obtained through a reaction between a 9,9-bis(hydroxyphenyl)fluorene and a compound corresponding to the groups $R_3$ and $R_4$ (such as alkylene oxide or haloalkanol).

For example, 9,9-bis[4-(2-hydroxyethoxyl)phenyl]fluorene is obtained by adding ethylene oxide to 9,9-bis(4-hydroxyphenyl)fluorene. 9,9-bis[4-(3-hydroxypropoxyl)phenyl]fluorene is obtained, for example, by reacting 9,9-bis[4-hydroxyphenyl]fluorene with 3-chloropropanol in an alkaline condition. 9,9-bis(hydroxyphenyl)fluorene can be obtained through a reaction between fluorenone (such as 9-fluorenone) and a corresponding phenol. 9,9-bis(4-hydroxyphenyl)fluorene can be obtained, for example, through a reaction between a phenol and 9-fluorenone.

<Unit (B)>

The unit (B) is a unit derived from an alicyclic aliphatic diol having a positive refractive index, preferably a unit (B1) represented by the following formula.

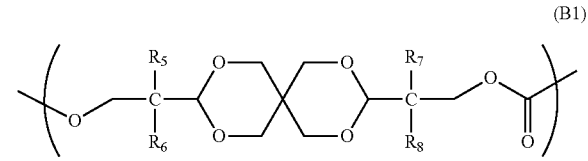

(B1)

In the above formula, $R_5$ to $R_8$ are each independently a hydrogen atom or alkyl group having 1 to 10 carbon atoms. The alkyl group is preferably an alkyl group having 1 to 3 carbon atoms. A methyl group is particularly preferred. The unit (B1) is derived from a dihydroxy compound having a spiro ring which has a low photoelastic constant and high heat resistance.

Specific examples of the unit (B1) are units derived from 3,9-bis(1,1-dimethyl-2-hydroxyethyl)-2,4,8,10-tetraoxaspiro[5,5]undecane, 3,9-bis(1,1-diethyl-2-hydroxyethyl)-2,4,8,10-tetraoxaspiro[5,5]undecane) and 3,9-bis(1,1-dipropyl-2-hydroxyethyl)-2,4,8,10-tetraoxaspiro[5,5]undecane.

A unit (B2) derived from 3,9-bis(1,1-dimethyl-2-hydroxyethyl)-2,4,8,10-tetraoxaspiro[5,5]undecane (to be referred to as "spiroglycol" hereinafter) and represented by the following formula is particularly preferred.

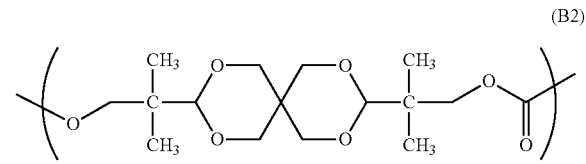

(B2)

The copolycarbonate used in the present invention comprises preferably the units (A) and (B), more preferably the units (A) and (B1).

<Composition Ratio>

The molar ratio {(A):(B)} of the unit (A) to the unit (B) in all the carbonate units is preferably 10:90 to 70:30, more preferably 20:80 to 60:40.

The molar ratio {(A):(B1)} of the unit (A) to the unit (B1) in all the carbonate units is preferably 10:90 to 70:30, more preferably 20:80 to 60:40.

When the ratio of the unit (A) is less than 10 mol %, the glass transition temperature of the copolycarbonate becomes lower than 110° C., thereby deteriorating heat resistance disadvantageously. When the ratio of the unit (A) is more than 70 mol %, the glass transition temperature of the copolycarbonate becomes high, thereby causing a problem with processability. Also, the photoelastic constant becomes larger than $30 \times 10^{-12}$ $Pa^{-1}$ disadvantageously. The molar ratio {(A)/(B)} of the unit (A) to the unit (B) can be calculated by measuring with the proton NMR of JNM-AL400 of JEOL Ltd.

(when "p" and "q" are 0)

The molar ratio {(A1):(B1)} of the unit (A1) to the unit (B1) in all the carbonate units is preferably 10:90 to 50:50, more preferably 20:80 to 40:60.

(when "p" and "q" are Each an Integer of 1 or More)

The molar ratio {(A3):(B1)} of the unit (A3) to the unit (B1) in all the carbonate units is preferably 20:80 to 70:30, more preferably 30:70 to 60:40.

<Glass Transition Temperature of Copolycarbonate>

The glass transition temperature (Tg) of the copolycarbonate is preferably 120 to 170° C., more preferably 120 to 160° C. When the glass transition temperature (Tg) is lower than 120° C., the heat-resistant stability of the copolycarbonate degrades and the retardation thereof changes along with the passage of time, which may affect display quality. When the glass transition temperature (Tg) is higher than 170° C. and melt film formation is to be carried out, the viscosity becomes too high, thereby making it difficult to form a film. The glass transition temperature (Tg) is measured by using the 2910 DSC of TA Instrument Japan Co., Ltd. at a temperature elevation rate of 20° C./min.

<Photoelastic Constant of Copolycarbonate>

The absolute value of the photoelastic constant of the copolycarbonate is preferably not more than $30 \times 10^{-12}$ $Pa^{-1}$, more preferably not more than $25 \times 10^{-12}$ $Pa^{-1}$, much more preferably not more than $20 \times 10^{-12}$ $Pa^{-1}$. When the absolute value is larger than $30 \times 10^{-12}$ $Pa^{-1}$ and the obtained film is used as a retardation film, the stress birefringence becomes large, whereby light slipping occurs disadvantageously. The photoelastic constant is measured by cutting out a test piece having a length of 50 mm and a width of 10 mm from the unstretched film and using the Spectroellipsometer M-220 of JASCO Corporation.

<Production of Copolycarbonate>

The copolycarbonate can be produced by reacting diols forming the unit (A) and the unit (B) in a predetermined ratio. The ratio may be adjusted to a desired value by blending a homopolycarbonate consisting of only the unit (A), a homopolycarbonate consisting of only the unit (B) and a copolycarbonate containing the unit (A) and the unit (B) with the copolycarbonate containing the unit (A) and the unit (B).

The copolycarbonate can be produced by melt polymerizing a fluorene dihydroxy component forming the unit (A), and an alicyclic aliphatic diol component and a diester carbonate forming the unit (B).

The diester carbonate is an ester such as aryl group or aralkyl group having 6 to 12 carbon atoms which may be substituted. Specific examples of the diester carbonate include diphenyl carbonate, ditolyl carbonate, bis(chlorophenyl)carbonate and m-cresyl carbonate. Out of these, diphenyl carbonate is particularly preferred.

The amount of diphenyl carbonate is preferably 0.97 to 1.10 moles, more preferably 1.00 to 1.06 moles based on 1 mole of the dihydroxy compound.

To accelerate the polymerization rate in the melt polymerization method, a polymerization catalyst may be used. The polymerization catalyst is selected from an alkali metal compound, an alkali earth metal compound, a nitrogen-containing compound and a metal compound.

Organic acid salts, inorganic salts, oxides, hydroxides, hydrides, alkoxides and quaternary ammonium hydroxides of an alkali metal or an alkali earth metal are preferably used as the above compounds and may be used alone or in combination.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium nitrate, potassium nitrate, cesium nitrate, lithium nitrate, sodium stearate, potassium stearate, cesium stearate, lithium stearate, sodium borohydride, sodium benzoate, potassium benzoate, cesium benzoate, lithium benzoate, disodium hydrogen phosphate, dipotassium hydrogen phosphate, dilithium hydrogen phosphate, disodium phenylphosphate, disodium salts, dipotassium salts, dicesium salts and dilithium salts of bisphenol A (BPA), and sodium salts and potassium salts, cesium salts and lithium salts of a phenol.

Examples of the alkali earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate and barium diacetate.

Examples of the nitrogen-containing compound include quaternary ammonium hydroxides having an alkyl group or aryl group such as tetramethylammonium hydroxide, tetraethylammonium hydroxide, tetrapropylammonium hydroxide, tetrabutylammonium hydroxide and trimethylbenzylammonium hydroxide, tertiary amines such as triethylamine, dimethylbenzylamine and triphenylamine, imidazoles such as 2-methylimidazole, 2-phenylimidazole and benzimidazole, and bases and basic salts such as ammonia, tetramethylammonium borohydride, tetrabutylammonium borohydride, tetrabutylammonium tetraphenylborate and tetraphenylammonium tetraphenylborate. Examples of the metal compound include zinc aluminum compounds, germanium compounds, organic tin compounds, antimony compounds, manganese compounds, titanium compounds and zirconium compounds. These compounds may be used alone or in combination of two or more.

The amount of the polymerization catalyst is preferably $1 \times 10^{-9}$ to $1 \times 10^{-2}$ equivalent, preferably $1 \times 10^{-8}$ to $1 \times 10^{-3}$ equivalent, more preferably $1 \times 10^{-7}$ to $1 \times 10^{-3}$ equivalent based on 1 mole of the diol component.

The melt polycondensation reaction is carried out under heating and agitation in an inert atmosphere under a reduced pressure while the formed monohydroxy compound is distilled off as having already been known.

The reaction temperature is generally 120 to 350° C., and the reaction is completed by increasing the degree of vacuum of the system to 10 to 0.1 Torr in the latter stage of the reaction to facilitate the distillation-off of the formed monohydroxy compound. An end-sealing agent and an antioxidant may be optionally added.

In the latter stage of the reaction, a catalyst deactivator may be added. Conventionally known catalyst deactivators are effectively used as the catalyst deactivator, out of which ammonium salts and phosphonium salts of sulfonic acid are preferred. Salts of dodecylbenzenesulfonic acid such as tetrabutylphosphonium salts of dedecylbenzenesulfonic acid and salts of paratoluenesulfonic acid such as tetrabutylammonium salts of paratoluenesulfonic acid are more preferred.

Methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate and phenyl paratoluenesulfonate are preferably used as the esters of sulfonic acid. Out of these, tetrabutylphosphonium salts of dodecylbenzenesulfonic acid are most preferably used. The amount of the catalyst deactivator is preferably 0.5 to 50 moles, more preferably 0.5 to 10 moles, much more preferably 0.8 to 5 moles based on 1 mole of the catalyst when at least one polymerization catalyst selected from an alkali metal compound and/or an alkali earth metal compound is used.

A heat stabilizer, plasticizer, optical stabilizer, polymerization metal inactivating agent, flame retardant, lubricant, antistatic agent, surfactant, antibacterial agent, ultraviolet absorbent and release agent may be used as required or according to application purpose.

<Production Method of Optical Film>

The optical film can be produced by a solution casting, melt extrusion, thermal press or calendering method. Out of these, the melt extrusion method is preferred from the viewpoint of productivity.

In the melt extrusion method, preferably, the resin is extruded from a T die and supplied onto a cooling roll. The temperature at this point which is determined from the molecular weight, Tg and melt flowability of the copolycarbonate is preferably 180 to 350° C., more preferably 200 to 320° C. When the temperature is lower than 180° C., the viscosity of the copolycarbonate becomes high, whereby the orientation and stress distortion of the copolycarbonate are apt to remain disadvantageously. When the temperature is higher than 350° C., such problems as thermal deterioration, coloration and the formation of a die line (streak) from the T die readily occur.

Since the copolycarbonate used in the present invention has high solubility in an organic solvent, the solution casting method may also be employed. In the case of the solution casting method, methylene chloride, 1,2-dichloroethane, 1,1,2,2-tetrachloroethane, dioxolan and dioxane are preferably used as solvents. The amount of the residual solvent contained in the film used in the solution casting method is preferably not more than 2 wt %, more preferably not more than 1 wt %. When the amount of the residual solvent is larger than 2 wt %, a reduction in the glass transition temperature of the film becomes significant, which is not preferred from the viewpoint of heat resistance.

The thickness of the unstretched optical film is in the range of preferably 30 to 400 μm, more preferably 40 to 300 μm. When the unstretched film is stretched to obtain a retardation film, the thickness of the unstretched film may be determined from the above range in consideration of the desired retardation and thickness of the optical film.

(Stretching Step)

The unstretched optical film obtained as described above is stretched and oriented to become a retardation film. The stretching method may be a conventional stretching method, for example, monoaxial stretching in the longitudinal direction, monoaxial stretching in the transverse direction by using a tenter, or simultaneous or sequential biaxial stretching which is a combination of these monoaxial stretchings. Biaxial stretching is preferably employed in the present invention. Although stretching is preferably carried out continuously from the viewpoint of productivity, it may be carried out in a batch manner.

The stretching temperature is preferably (Tg−20° C.) to (Tg+50° C.) (Tg is the glass transition temperature of the copolycarbonate), more preferably (Tg−10° C.) to (Tg+30° C.). Within this temperature range, the molecular motion of the polymer becomes moderate, relaxation hardly occurs by stretching, and the control of orientation becomes easy, thereby making it easy to obtain a desired Re value advantageously.

The draw ratio is determined by a target retardation and preferably 1.05 to 5 times, more preferably 1.1 to 4 times in both longitudinal and transverse directions. This stretching may be carried out in one stage or multiple stages. The above Tg when the film obtained by the solution casting method is to be stretched is the glass transition temperature of the film containing a trace amount of a solvent.

(Heat Setting Step)

The heat setting step is carried out in a heat setting zone in the stretching step. After the step of stretching in the transverse direction in the stretching zone, the stretched film is guided into the heat setting zone from the stretching zone. The heat setting step is the step of stabilizing the optical properties of the stretched film by heating the stretched film in the heat setting zone kept at a heat setting temperature (ambient temperature in the heat setting zone) while the width of the film at the end of the stretching step is maintained. The heat setting temperature is preferably lower than the conventional heat setting temperature because the film of the present invention is made of a copolymer of a high-Tg component and a low-Tg component and differs from an ordinary polycarbonate film made of bisphenol A.

Stated more specifically, preferably T1 (stretching temperature)−T2 (heat setting temperature)=−10 to 30° C., more preferably T1−T2=0 to 20° C., particularly preferably T1−T2=5 to 15° C. When T1−T2 is lower than −10° C., the retardation sharply drops and a target retardation value may not be obtained, or the optical axis is greatly shifted due to bowing. When T1−T2 is higher than 30° C., the film is easily broken, thereby reducing productivity.

(Thermal Relaxation Step)

The production method of the retardation film in this embodiment may further comprise a thermal relaxation step. This thermal relaxation step may be carried out between the transverse-direction stretching step and the heat setting step. Therefore, for the heat relaxation step, a thermal relaxation zone whose temperature can be set independently of other zones may be formed between the stretching zone and the heat setting zone, or in the heat setting zone.

In the thermal relaxation step, after the film is stretched to a predetermined width in the transverse-direction stretching step, needless distortion can be removed from the stretched film by reducing the interval between chucks facing each other in the width direction by several percent. A retardation film which is more excellent in optical uniformity can be obtained by removing this distortion.

Stated more specifically, the interval between chucks facing each other in the width direction is reduced by preferably 0.5 to 5.0%, more preferably 1.0 to 3.0%, particularly preferably 2.0 to 2.5%. When the interval between chucks is reduced by more than 5.0%, the optical axis is greatly shifted by bowing, thereby causing a problem. When the interval between chucks is reduced by less than 0.5%, the film is easily broken, thereby reducing productivity.

(Thickness)

The thickness (d) of the optical film of the present invention which is relevant to a target retardation is 20 to 80 μm, preferably 30 to 70 μm. Within this range, a desired R(550) value is easily obtained by stretching, and film formation is easy advantageously.

(Wavelength Dispersion)

The optical film of the present invention has a characteristic feature that the retardation within the plane of the film becomes smaller as the wavelength becomes shorter at a visible wavelength rage of 400 to 800 nm. That is, the retardations R(450), R(550) and R(650) within the plane of the film at wavelengths of 450 nm, 550 nm and 650 nm satisfy the following formulas (1) and (2).

$$0.6 < R(450)/R(550) < 1 \tag{1}$$

$$1.01 < R(650)/R(550) < 1.40 \tag{2}$$

The in-plane retardation R is defined by the following formula and indicates a phase delay between the X direction of light passing in a direction perpendicular to the film and a Y direction perpendicular to the X direction.

$$R = (n_x - n_y) \times d$$

In the above formula, $n_x$ is the refractive index of a slow axis (axis having the highest refractive index) within the plane of the film, $n_y$ is a refractive index in a direction perpendicular to $n_x$ within the plane of the film, and d is the thickness of the film.

The following formulas (1-i) and (2-i) are preferably satisfied as the wavelength dispersion characteristic of the retardation.

$$0.65 < R(450)/R(550) < 0.92 \tag{1-i}$$

$$1.01 < R(650)/R(550) < 1.30 \tag{2-i}$$

The following formulas (1-ii) and (2-ii) are more preferably satisfied.

$$0.7 < R(450)/R(550) < 0.88 \tag{1-ii}$$

$$1.04 < R(650)/R(550) < 1.20 \tag{2-ii}$$

(in-Plane Retardation)

The retardation film of the present invention can be used alone as a broadband λ/4 plate without laminating another film. The retardation R(550) within the plane of the film at a wavelength of 550 nm is 120 to 160 nm, preferably 125 to 150 nm.

The retardation and wavelength dispersion characteristic of a stretched film having a length of 50 mm and a width of 10 mm are measured by using the Spectroellipsometer M-220 of JASCO Corporation.
(Nz Coefficient)

The Nz coefficient represented by the following formula (4) is 1.18 to 2.40, preferably 1.20 to 2.40, more preferably 1.30 to 1.70, much more preferably 1.30 to 1.55. The Nz coefficient of a stretched film having a length of 50 mm and a width of 30 mm is measured by using the KOBRA-WFD of Ohji Keisoku Kiki Co., Ltd.

$$Nz=(n_x-n_z)/(n_x-n_y) \quad (4)$$

$n_x$, $n_y$ and $n_z$ in the above formula (4) are 3-dimensional birefringences of the film, $n_x$ is the refractive index of an a slow axis (x axis) within the plane of the film, $n_y$ is a refractive index in a direction (y axis) orthogonal to the x axis in the in-plane direction, and $n_z$ is a refractive index in a thickness direction (z axis) perpendicular to the plane including the x axis and the y axis.
(Birefringence)

The birefringence (Δn) represented by the following formula (3) of the optical film of the present invention is not less than $1.5 \times 10^{-3}$, preferably not less than $1.6 \times 10^{-3}$, more preferably not less than $1.7 \times 10^{-3}$. Although the upper limit is not particularly limited, a birefringence of not more than $3.0 \times 10^{-3}$ suffices. d is the thickness (μm) of the film.

$$\Delta n=R(550)/(d \times 10^3) \quad (3)$$

(Others)

The photoelastic constant of the copolycarbonate constituting the optical film of the present invention is low. Therefore, a change in retardation by stress is small and a liquid crystal display comprising the retardation film becomes excellent in display stability.

The absolute value of "photoelastic constant× thickness" of the optical film of the present invention is proportionate to light slipping and preferably not more than $1,700 \times 10^{-12}$ Pa$^{-1}$·μm, more preferably not more than $1,500 \times 10^{-12}$ Pa$^{-1}$·μm, much more preferably not more than $1,000 \times 10^{-12}$ Pa$^{-1}$·μm.

The optical film of the present invention preferably has high transparency with a total light transmittance of desirably not less than 85%, more desirably not less than 88%. The haze value is preferably not more than 5%, more preferably not more than 3%.

The optical film of the present invention is used as a film for optical purposes. Specifically, it is preferably used as a retardation film, plastic cell substrate film, polarizing plate protective film, antireflection film, brightness increasing film, protective film for optical disks or diffusion film. It is particularly preferably used as a retardation film or a polarizing plate protective film. The optical film of the present invention, especially a retardation film may be used in a liquid crystal display.

EXAMPLES

The following examples are provided for the purpose of further illustrating the present invention but are in no way to be taken as limiting. "Parts" in the examples means "parts by weight". The resins and evaluation methods used in the examples are as follows.
1. Photoelastic Constant A test piece having a length of 50 mm and a width of 10 mm was cut out from the center portion of the unstretched film obtained in each of the examples to measure its photoelastic constant by using the Spectroellipsometer M-220 of JASCO Corporation.
2. Wavelength Dispersion and Retardation A test piece having a length of 50 mm and a width of 10 mm was cut out from the center portion of the unstretched film obtained in each of the examples to measure its wavelength dispersion and retardation by using the Spectroellipsometer M-220 of JASCO Corporation.
3. Nz Coefficient A test piece having a length of 50 mm and a width of 30 mm was cut out from the center portion of the unstretched film obtained in each of the examples to measure its Nz coefficient by using KOBRA-WFD.
4. Tg (Glass Transition Temperature)

This was measured in a nitrogen atmosphere at a temperature elevation rate of 20° C./min with the 2910 DSC of TA Instrument Japan Co., Ltd.
5. Film Thickness (d)

The thickness of the center portion of the film obtained in each of the examples was measured with the electronic micro-film thickness meter of Anritsu Corporation.
6. Polymer Composition Ratio (NMR)

The composition ratio of the polymer was calculated by measuring with the proton NMR of the JNM-AL400 of JEOL Ltd.
7. Viscosity Average Molecular Weight (M)

The specific viscosity at 20° C. of a solution prepared by dissolving 0.7 g of the copolycarbonate in 100 ml of methylene chloride was measured to calculate the viscosity average molecular weight from the following formulas.

$$\eta_{sp}/c=[\eta]+0.45\times[\eta]^2 c$$

$$[\eta]=1.23\times10^{-4}M^{0.83}$$

$\eta_{sp}$: specific viscosity
$\eta$: intrinsic viscosity
C: constant (=0.7)
M: viscosity average molecular weight Example 1

Production of Copolycarbonate 80.26 parts of 3,9-bis(2-hydroxy-1,1-dimethylethyl)-2,4,8,10-tetraoxaspiro[5.5]undecane (to be referred to as "spiroglycol" hereinafter), 51.41 parts of 9,9-bis(4-hydroxy-3-methylphenyl)fluorene (to be referred to as "BCF" hereinafter), 89.29 parts of diphenyl carbonate, and $1.8\times10^{-2}$ part of tetramethylammonium hydroxide and $1.6\times10^{-4}$ part of sodium hydroxide as catalysts were heated at 180° C. in a nitrogen atmosphere to be molten. Thereafter, the degree of vacuum was set to 13.4 kPa over 30 minutes. Then, the temperature was raised to 260° C. at a rate of 60° C./hr and maintained at that temperature for 10 minutes, and the degree of vacuum was set to 133 Pa or less over 1 hour. A reaction was carried out under agitation for a total of 6 hours. After the end of the reaction, tetrabutylphosphonium dodecylbenzenesulfonate was added in an amount that was 4 times the total molar amount of the catalysts to deactivate the catalysts, and the resulting product was discharged from the bottom of a reaction tank under an increased nitrogen pressure and cut with a pelletizer while it was cooled in a water tank to obtain a pellet. The viscosity average molecular weight and glass transition temperature (Tg) of this pellet were measured, and the composition ratio of the pellet was measured by NMR. The results are shown in Table 1.
<Production of Optical Film>

Subsequently, a T die having a width of 150 mm and a lip width of 500 μm and a film take-up device were set in the 15 mmϕ double-screw extruder of Techno Bell Co., Ltd., and the obtained copolycarbonate pellet was molded into a film at an extrusion temperature of 280° C. to obtain a transparent extruded film. The photoelastic constant of this film was measured. The obtained film was stretched to 1.5 times monoaxially in the longitudinal direction at a stretching temperature of (Tg+9° C.) (144° C.) and then to 2.6 times in the transverse direction and heat set at a temperature of stretching temperature−11° C. (133° C.) Thermal relaxation was carried out by expanding the interval between chucks by 2.2% to obtain a biaxially oriented film. The thickness (d), retardation, wavelength dispersion and Nz coefficient of this stretched film were measured. The results are shown in Table 1.

A polarizing plate on both sides of a commercially available reflection type VA liquid crystal panel was removed, an optically anisotropic layer of liquid crystals was formed on the above film and laminated with the polarizing plate, and the resulting laminate was bonded to both sides of a liquid crystal cell by an adhesive to obtain a liquid crystal panel. When the display screen of this liquid crystal panel was checked, it had good contrast and a wide view angle.

Example 2

Production of Optical Film

A film was produced in the same manner as in Example 1. The operation of Example 1 was repeated except that the obtained film was stretched to 2.5 times in the transverse direction to obtain a biaxially oriented film. The thickness, retardation, wavelength dispersion and Nz coefficient of this stretched film were measured. The results are shown in Table 1.

When the display screen of a liquid crystal panel which was produced by using the obtained stretched film in the same manner as in Example 1 was checked, it had good contrast and a wide view angle.

Example 3

Production of Copolycarbonate

The operation of Example 1 was repeated except that 85.13 parts of spiroglycol, 45.37 parts of BCF and 89.29 parts of diphenyl carbonate were used to obtain an aromatic-aliphatic copolycarbonate. The viscosity average molecular weight and glass transition temperature of the obtained pellet were measured, and the composition ratio of the pellet was measured by NMR. The results are shown in Table 1.
<Production of Optical Film>

This copolymer was dissolved in methylene chloride to produce a dope having a solid content of 19 wt %. A cast film was produced from this dope solution by a known method. The operation of Example 1 was repeated to obtain a biaxially oriented film from this film. The thickness, retardation, wavelength dispersion and Nz coefficient of this stretched film were measured. The results are shown in Table 1.

When the display screen of a liquid crystal panel which was produced from the obtained stretched film in the same manner as in Example 1 was checked, it had good contrast and a wide view angle.

Example 4

Production of Copolycarbonate

The operation of Example 1 was repeated except that 72.97 parts of spiroglycol, 60.49 parts of BCF and 89.29 parts of diphenyl carbonate were used to obtain an aromatic-aliphatic copolycarbonate. The viscosity average molecular weight and glass transition temperature of the obtained pellet were measured, and the composition ratio of the pellet was measured by NMR. The results are shown in Table 1.
<Production of Optical Film>

A film was produced in the same manner as in Example 3. A cast film was produced from this dope solution by a known method. The operation of Example 1 was repeated to obtain a biaxially oriented film from this film. The thickness, retardation, wavelength dispersion and Nz coefficient of this stretched film were measured. The results are shown in Table 1.

When the display screen of a liquid crystal panel which was produced from the obtained stretched film in the same manner as in Example 1 was checked, it had good contrast and a wide view angle.

Example 5

Production of Copolycarbonate 60.8 parts of spiroglycol, 87.7 parts of 9,9-bis[4-(2-hydroxyethoxyl)phenyl]fluorene (to be referred to as "BPEF" hereinafter), 89.3 parts of diphenyl carbonate, and $1.8 \times 10^{-2}$ part of tetramethylammonium hydroxide and $1.6 \times 10^{-4}$ part of sodium hydroxide as catalysts were heated at 180° C. in a nitrogen atmosphere to be molten. Thereafter, the degree of vacuum was set to 13.4 kPa over 30 minutes. Then, the temperature was raised to 260° C. at a rate of 60° C./hr and maintained at that temperature for 10 minutes, and the degree of vacuum was set to 133 Pa or less over 1 hour. A reaction was carried out under agitation for a total of 6 hours. After the end of the reaction, tetrabutylphosphonium dodecylbenzenesulfonate was added in an amount that was 4 times the total molar amount of the catalysts to deactivate the catalysts, and the resulting product was discharged from the bottom of a reaction tank under an increased nitrogen pressure and cut with a pelletizer while it was cooled in a water tank to obtain a pellet. The viscosity average molecular weight and glass transition temperature of the obtained pellet were measured, and the composition ratio of the pellet was measured by NMR. The results are shown in Table 1.
<Production of Optical Film>

A film was produced in the same manner as in Example 1. The operation of Example 1 was repeated except that the obtained film was stretched to 2.8 times in the transverse direction to obtain a biaxially oriented film. The thickness, retardation, wavelength dispersion and Nz coefficient of the obtained stretched film were measured. The results are shown in Table 1.

When the display screen of a liquid crystal panel which was produced from the obtained stretched film in the same manner as in Example 1 was checked, it had good contrast and a wide view angle.

Example 6

Production of Copolycarbonate

The operation of Example 5 was repeated except that 72.96 parts of spiroglycol, 70.16 parts of BPEF and 89.29 parts of diphenyl carbonate were used to obtain an aromatic-aliphatic copolycarbonate. The viscosity average molecular weight and glass transition temperature of the obtained pellet were measured, and the composition ratio of the pellet was measured by NMR. The results are shown in Table 1.
<Production of Optical Film>

A film was produced in the same manner as in Example 1. The operation of Example 1 was repeated except that the obtained film was stretched to 2.8 times in the transverse direction to obtain a biaxially oriented film. The thickness, retardation, wavelength dispersion and Nz coefficient of the obtained stretched film were measured. The results are shown in Table 1.

When the display screen of a liquid crystal panel which was produced from the obtained stretched film in the same manner as in Example 1 was checked, it had good contrast and a wide view angle.

Example 7

Production of Copolycarbonate

The operation of Example 5 was repeated except that 48.64 parts of spiroglycol, 105.24 parts of BPEF and 89.29 parts of diphenyl carbonate were used to obtain an aromatic-aliphatic copolycarbonate. The viscosity average molecular weight and glass transition temperature of the obtained pellet were measured, and the composition ratio of the pellet was measured by NMR. The results are shown in Table 1.
<Production of Optical Film>
A film was produced in the same manner as in Example 3. A cast film was produced from this dope solution by a known method. The operation of Example 1 was repeated except that the obtained film was stretched to 2.8 times in the transverse direction to obtain a biaxially oriented film. The thickness, retardation, wavelength dispersion and Nz coefficient of the obtained stretched film were measured. The retardation and wavelength dispersion of the obtained stretched film were measured. The results are shown in Table 1.

When the display screen of a liquid crystal panel which was produced from the obtained stretched film in the same manner as in Example 1 was checked, it had good contrast and a wide view angle.

Example 8

Production of Optical Film

A film was produced in the same manner as in Example 1. The operation of Example 1 was repeated except that the obtained film was stretched to 2.7 times in the transverse direction without stretching in the longitudinal direction to obtain a transverse-direction stretched film. The thickness, retardation, wavelength dispersion and Nz coefficient of the obtained stretched film were measured. The results are shown in Table 1.

When the display screen of a liquid crystal panel which was produced from the obtained stretched film in the same manner as in Example 1 was checked, it had good contrast and a wide view angle.

Comparative Example 1

Production of Copolycarbonate 9,809 parts of ion exchange water and 2,271 parts of a 48% sodium hydroxide aqueous solution were added to a reactor equipped with a thermometer, stirrer and reflux condenser, 1,775 parts of 2,2-bis(4-hydroxyphenyl)propane (BPA) and 3.5 parts of sodium hydrosulfite were dissolved in the resulting solution, 7,925 parts of methylene chloride was added, and 1,000 parts of phosgene was blown into the reactor under agitation at 16 to 20° C. for 60 minutes. After phosgene was blown in, 52.6 parts of p-tert-butylphenol and 327 parts of a 48% sodium hydroxide aqueous solution were added, and further 1.57 parts of triethylamine was added and stirred at 20 to 27° C. for 40 minutes to terminate a reaction. A methylene chloride layer containing the product was cleaned with diluted hydrochloric acid and pure water, and methylene chloride was evaporated to obtain a copolycarbonate. The obtained copolycarbonate was pelletized with a 15 mmφ double-screw extruder. The viscosity average molecular weight and glass transition temperature of the obtained pellet were measured. The results are shown in Table 1.
<Production of Optical Film>
A film was produced in the same manner as in Example 1. The operation of Example 1 was repeated except that the obtained film was stretched to 1.3 times in the transverse direction without stretching in the longitudinal direction to obtain a stretched film. The thickness, retardation, wavelength dispersion and Nz coefficient of the obtained stretched film were measured. The results are shown in Table 1.

When the display screen of a liquid crystal panel which was produced from the obtained stretched film in the same manner as in Example 1 was checked, it had low contrast and did not have a wide view angle. The film had a high photoelastic constant of $80 \times 10^{-12}$ $Pa^{-1}$ and a large stress birefringence. Therefore, when it is used as a retardation film, light slipping occurs disadvantageously. Further, since its wavelength dispersion is positive, it cannot be used as a λ/4 plate at a broad band and color leaking occurs.

TABLE 1

| | BCF mol % | BPEF mol % | SPG mol % | BPA mol % | d μm | R(550) nm | R(450)/R(550) | R(650)/R(550) |
|---|---|---|---|---|---|---|---|---|
| Example 1 | 34 | — | 66 | — | 59 | 140 | 0.88 | 1.05 |
| Example 2 | 34 | — | 66 | — | 66 | 125 | 0.88 | 1.05 |
| Example 3 | 30 | — | 70 | — | 53 | 151 | 0.90 | 1.04 |
| Example 4 | 40 | — | 60 | — | 68 | 121 | 0.80 | 1.07 |
| Example 5 | — | 50 | 50 | — | 64 | 132 | 0.87 | 1.04 |
| Example 6 | — | 40 | 60 | — | 58 | 140 | 0.93 | 1.04 |
| Example 7 | — | 60 | 40 | — | 67 | 127 | 0.78 | 1.08 |
| Example 8 | 34 | — | 66 | — | 43 | 135 | 0.88 | 1.05 |
| Comparative Example 1 | — | — | — | 100 | 67 | 140 | 1.08 | 0.97 |

| | Δn × $10^{-3}$ | Nz | Photoelastic constant $10^{-12}$ Pa | Photoelastic constant × d $10^{-12}$ Pa · μm | Tg ° C. | Viscosity average molecular weight (pellet) | Film production method |
|---|---|---|---|---|---|---|---|
| Example 1 | 2.4 | 1.43 | 15 | 885 | 135 | 18800 | Melt film formation |
| Example 2 | 1.9 | 1.49 | 15 | 990 | 135 | 18800 | Melt film formation |

TABLE 1-continued

| | | | | | | | |
|---|---|---|---|---|---|---|---|
| Example 3 | 2.8 | 1.51 | 15 | 795 | 133 | 19000 | Casting method |
| Example 4 | 1.8 | 1.36 | 16 | 1088 | 146 | 19200 | Casting method |
| Example 5 | 2.1 | 1.38 | 23 | 1472 | 128 | 20300 | Melt film formation |
| Example 6 | 2.4 | 1.42 | 19 | 1102 | 122 | 18800 | Melt film formation |
| Example 7 | 1.9 | 1.35 | 24 | 1608 | 133 | 19200 | Casting method |
| Example 8 | 3.1 | 1.18 | 15 | 645 | 135 | 18800 | Melt film formation |
| Comparative Example 1 | 2.1 | 1.96 | 80 | 5360 | 140 | 15300 | Melt film formation |

Effect of the Invention

The optical film of the present invention has a desired wavelength dispersion characteristic, a low photoelastic constant, excellent melt processability and a desired Nz coefficient, can be made thin due to its high birefringence and can expand the bandwidth by itself.

INDUSTRIAL APPLICABILITY

The optical film of the present invention is extremely useful as a retardation film for liquid crystal displays and organic EL displays.

The invention claimed is:
1. A method of producing an optical film comprising the steps of,
  (i) melt extruding a copolymer to form an extruded film, and
  (ii) stretching the extruded film 1.05 to 5 times in both longitudinal and transverse directions to obtain the optical film,
  wherein the copolymer contains a unit (A3) represented by the following formula:

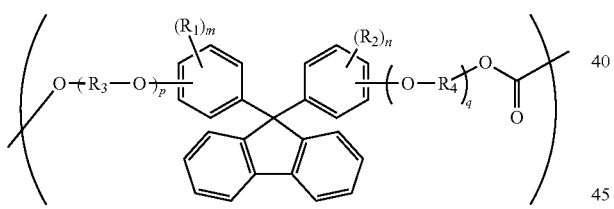

(A3)

wherein $R_1$ and $R_2$ are each independently a hydrogen atom, hydrocarbon group having 1 to 10 carbon atoms which may contain an aromatic group, or halogen atom, $R_3$ and $R_4$ are each independently a hydrocarbon group having 1 to 10 carbon atoms which may contain an aromatic group, m and n are each independently an integer of 1 to 4, and p and q are each independently an integer of 1 or more,
and a unit (B1) represented by the following formula:

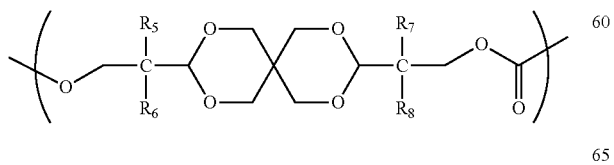

(B1)

wherein $R_5$ to $R_8$ are each independently a hydrogen atom or alkyl group having 1 to 10 carbon atoms, wherein a molar ratio {(A3):(B1)} of the unit (A3) to the unit (B1) is 40:60 to 60:40,
wherein the optical film meets the following conditions (i) to (v):
(i) a thickness (d) is 20 to 80 μm;
(ii) the following formulas (1) and (2) are satisfied:

$$0.6 < R(450)/R(550) < 0.93 \quad (1)$$

$$1.04 \leq R(650)/R(550) < 1.40 \quad (2),$$

wherein R(450), R(550) and R(650) are retardations within a plane of the film at wavelengths of 450 nm, 550 nm and 650 nm, respectively;
(iii) R(550) is 125 to 160 nm R(550) is a retardation within the plane of the film at a wavelength of 550 nm;
(iv) the birefringence (Δn) represented by the following formula (3) is not less than $1.5 \times 10^{-3}$:

$$\Delta n = R(550)/(d \times 10^3) \quad (3),$$

wherein d is the thickness (μm) of the film; and
(v) the Nz coefficient represented by the following formula (4) is 1.20 to 2.40:

$$Nz = (n_x - n_z)/(n_x - n_y) \quad (4)$$

wherein $n_x$, $n_y$ and $n_z$ are 3-dimensional birefringences of the film, $n_x$ is a refractive index of an in-plane slow axis (x axis), $n_y$ is a refractive index in a direction (y axis) orthogonal to the x axis in the in-plane direction, and $n_z$ is a refractive index in a thickness direction (z axis) perpendicular to the plane including the x axis and the y axis.

2. The method according to claim 1, wherein the copolymer contains a unit (A4) represented by the following formula:

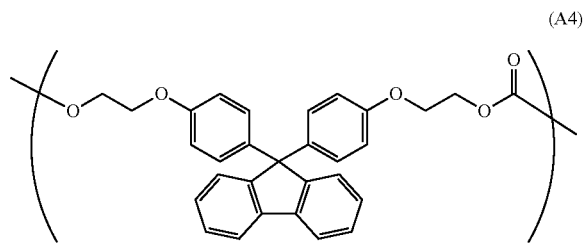

(A4)

and a unit (B2) represented by the following formula:

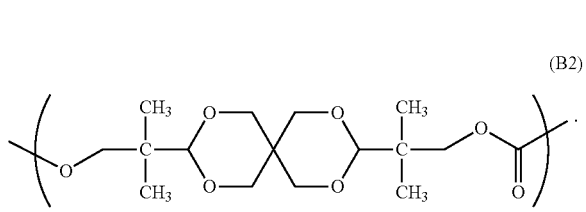

(B2)

3. The method according to claim 1, wherein an absolute value of a photoelastic constant of the copolymer is not more than $30 \times 10^{-12}$ $Pa^{-1}$.

4. The method according to claim 1, wherein an absolute value of "photoelastic constant x thickness" of the optical film is not more than $1,700 \times 10^{-12}$ $Pa^{-1} \cdot \mu m$.

5. The method according to claim 1, wherein a glass transition temperature of the copolymer is 120 to 170° C.

\* \* \* \* \*